US008773629B2

(12) United States Patent
Uehara et al.

(10) Patent No.: US 8,773,629 B2
(45) Date of Patent: Jul. 8, 2014

(54) LIQUID CRYSTAL OPTICAL APPARATUS AND IMAGE DISPLAY DEVICE HAVING PARTICULAR ELECTRODES

(75) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP); Yuko Kizu, Kanagawa-ken (JP); Yoshiharu Momonoi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 113 days.

(21) Appl. No.: 13/617,392

(22) Filed: Sep. 14, 2012

(65) Prior Publication Data

US 2013/0271678 A1    Oct. 17, 2013

(30) Foreign Application Priority Data

Apr. 13, 2012   (JP) .................................. 2012-092357

(51) Int. Cl.
*G02F 1/1343*   (2006.01)
*G02F 1/133*    (2006.01)

(52) U.S. Cl.
USPC .............................. 349/146; 349/143; 349/33

(58) Field of Classification Search
CPC .............. G02F 1/1393; G02F 1/13306; G02F 1/134336; G02F 1/133707; G09G 3/3648
USPC ............................................. 349/146, 143, 33
See application file for complete search history.

(56) References Cited

U.S. PATENT DOCUMENTS 7,612,848 B2 * 11/2009 Takatori et al. ............... 349/113
7,649,251 B2 *  1/2010 Kuwajima et al. ............ 257/693
8,456,599 B2 *  6/2013 Jeong et al. ................... 349/141

FOREIGN PATENT DOCUMENTS

JP          2010-224191         10/2010

* cited by examiner

*Primary Examiner* — Mike Qi
(74) *Attorney, Agent, or Firm* — Finnegan, Henderson, Farabow, Garrett & Dunner, L.L.P.

(57) ABSTRACT

According to one embodiment, a liquid crystal optical apparatus includes a first substrate unit, a second substrate unit, and a liquid crystal layer. The first substrate unit includes a first substrate and a plurality of first electrodes. The first electrodes are provided on the first substrate to extend in a first direction. Each of the first electrodes has a first side surface and a second side surface opposite to the first side surface. The second substrate unit includes a second substrate and an opposing electrode. The second substrate opposes the first substrate. The opposing electrode is provided on the second substrate to oppose the first electrodes. The liquid crystal layer is provided between the first substrate unit and the second substrate unit. The first side surface has a first protruding portion and a first recessed portion arranged with the first protruding portion in the first direction.

20 Claims, 5 Drawing Sheets

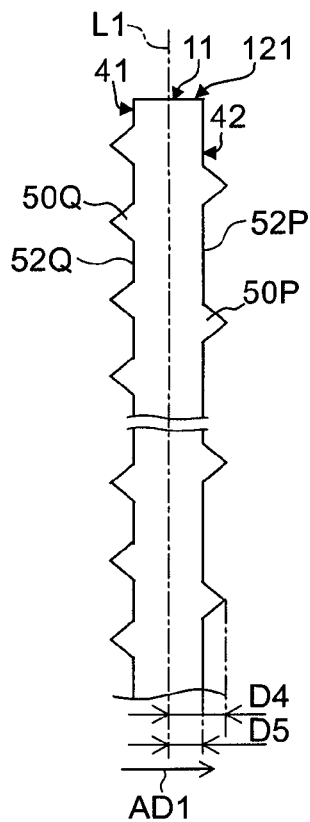
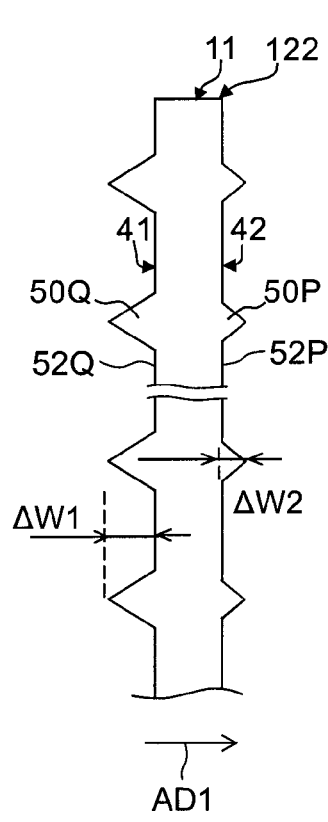
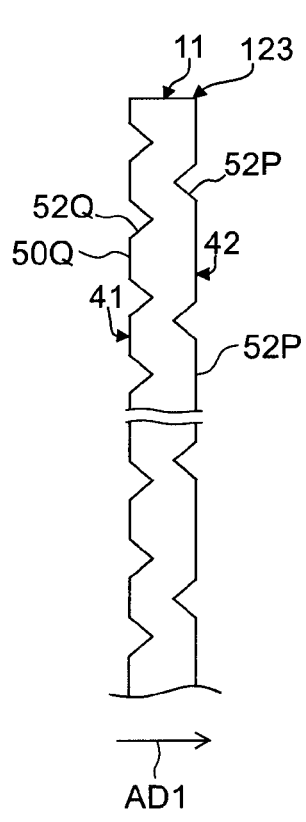
FIG. 4A  FIG. 4B  FIG. 4C
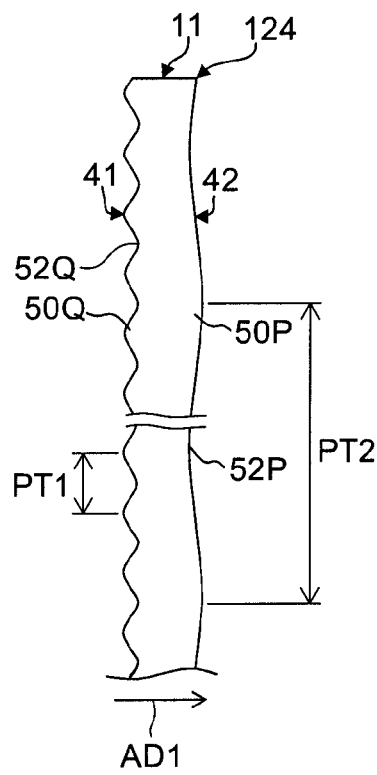
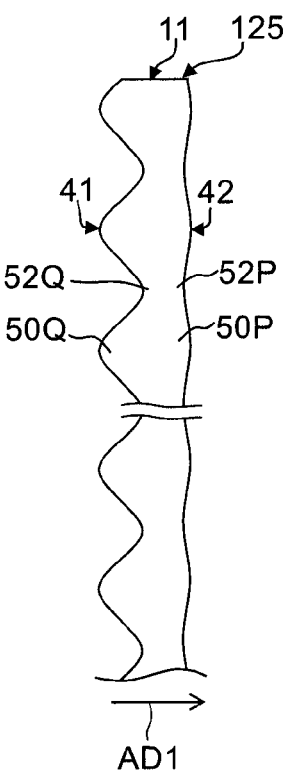
FIG. 4D  FIG. 4E

LIQUID CRYSTAL OPTICAL APPARATUS AND IMAGE DISPLAY DEVICE HAVING PARTICULAR ELECTRODES

CROSS-REFERENCE TO RELATED APPLICATIONS

This application is based upon and claims the benefit of priority from the prior Japanese Patent Application No. 2012-092357, filed on Apr. 13, 2012; the entire contents of which are incorporated herein by reference.

FIELD

Embodiments described herein relate generally to a liquid crystal optical apparatus and an image display device.

BACKGROUND

A liquid crystal optical apparatus is known that utilizes the birefringence of liquid crystal molecules to change the distribution of the refractive index according to the application of a voltage. There is a stereoscopic image display device that combines such a liquid crystal optical apparatus with an image display unit.

Such a stereoscopic image display device switches between a state in which an image displayed on the image display unit is caused to be incident on the eyes of a human viewer as displayed on the image display unit and a state in which the image displayed on the image display unit is caused to be incident on the eyes of the human viewer as multiple parallax images by changing the distribution of the refractive index of the liquid crystal optical apparatus. Thereby, a two-dimensional image display operation and a three-dimensional image display operation are realized. High display quality is desirable for such display devices.

BRIEF DESCRIPTION OF THE DRAWINGS

FIG. 4A to FIG. 4E are schematic plan views illustrating the configurations of portions of other liquid crystal optical units according to the first embodiment;

DETAILED DESCRIPTION

Figure 1:
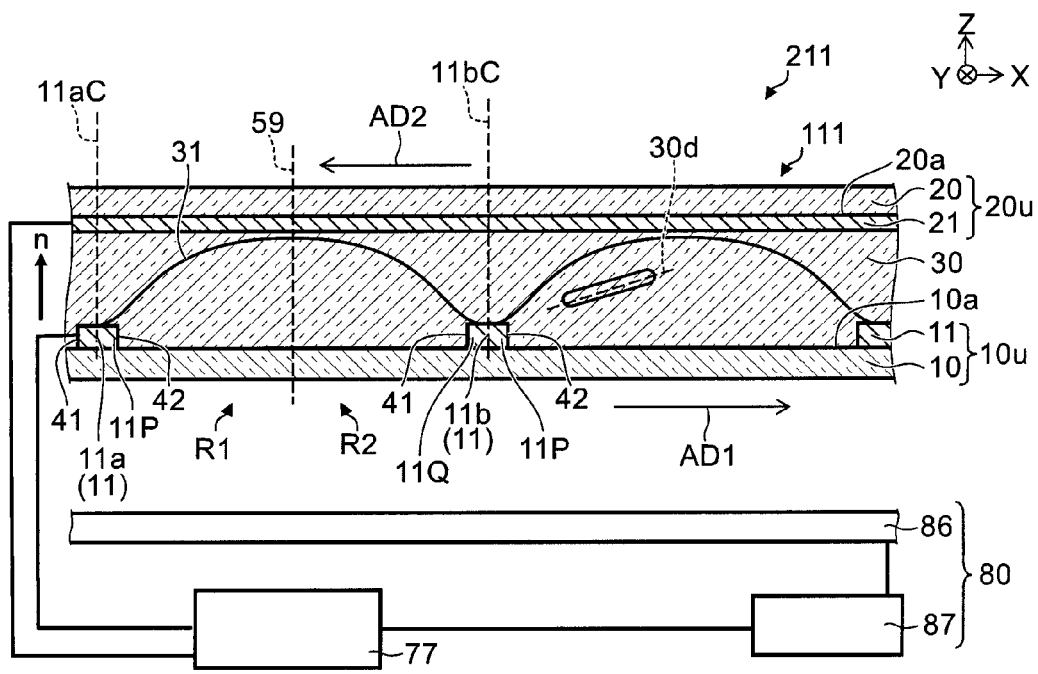
FIG. 1 is a schematic cross-sectional view illustrating a liquid crystal optical apparatus and an image display device according to a first embodiment.

According to one embodiment, a liquid crystal optical apparatus includes a first substrate unit, a second substrate unit, and a liquid crystal layer. The first substrate unit includes a first substrate and a plurality of first electrodes. The first electrodes are provided on the first substrate to extend in a first direction. The first electrodes are arranged in a direction intersecting the first direction. Each of the first electrodes has a first side surface and a second side surface opposite to the first side surface. Each of the first and second side surfaces is non-parallel to the first substrate to extend in the first direction. The second substrate unit includes a second substrate and an opposing electrode. The second substrate opposes the first substrate. The opposing electrode is provided on the second substrate to oppose the first electrodes. The liquid crystal layer is provided between the first substrate unit and the second substrate unit. The first side surface has a first protruding portion and a first recessed portion arranged with the first protruding portion in the first direction.

According to another embodiment, an image display device includes a liquid crystal optical unit and an image display unit. The liquid crystal optical unit includes a first substrate unit, a second substrate unit, and a liquid crystal layer. The first substrate unit includes a first substrate and a plurality of first electrodes. The plurality of first electrodes is provided on the first substrate to extend in a first direction. The first electrodes are arranged in a direction intersecting the first direction. Each of the first electrodes has a first side surface and a second side surface. Each of the first and second side surfaces is non-parallel to the first substrate to extend in the first direction. The second substrate unit includes a second substrate and an opposing electrode. The second substrate opposes the first substrate. The opposing electrode is provided on the second substrate to oppose the first electrodes. The liquid crystal layer is provided between the first substrate unit and the second substrate unit. The image display unit is stacked with the liquid crystal optical unit. The image display unit includes a display unit configured to cause light including image information to be incident on the liquid crystal layer. The first side surface has a first protruding portion and a first recessed portion arranged with the first protruding portion in the first direction.

Various embodiments will be described hereinafter with reference to the accompanying drawings.

The drawings are schematic or conceptual; and the relationships between the thicknesses and the widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic cross-sectional view illustrating a liquid crystal optical apparatus and an image display device according to a first embodiment.

As illustrated in FIG. 1, the image display device 211 according to this embodiment includes a liquid crystal optical unit 111 (a liquid crystal optical apparatus) and an image display unit 80. Any display device may be used as the image display unit 80. For example, the image display unit 80 may include a liquid crystal display device, an organic EL display device, a plasma display, etc.

The liquid crystal optical unit 111 includes a first substrate unit 10u, a second substrate unit 20u, and a liquid crystal layer 30.

The first substrate unit 10u includes a first substrate 10 and multiple first electrodes 11.

The first substrate 10 has a first major surface 10a. The multiple first electrodes 11 are provided on the first major surface 10a. Each of the multiple first electrodes 11 extends in a first direction. The multiple first electrodes 11 are arranged in a direction intersecting the first direction. Three of the multiple first electrodes 11 are illustrated in FIG. 1. The number of the multiple first electrodes 11 is arbitrary.

The first direction is taken as a Y-axis direction. A direction parallel to the major surface 10a and perpendicular to the Y-axis direction is taken as an X-axis direction. A direction perpendicular to the X-axis direction and the Y-axis direction is taken as a Z-axis direction.

For example, the multiple first electrodes 11 are arranged along the X-axis direction.

Two most proximal first electrodes 11 of the multiple first electrodes 11 will now be focused upon. One electrode of the two most proximal first electrodes 11 is taken as a first major electrode 11a. The other electrode of the two most proximal first electrodes 11 is taken as a second major electrode 11b.

A central axis 59 is set between the most proximal first electrodes 11 (e.g., the first major electrode 11a and the second major electrode 11b). The central axis 59 is parallel to the Y-axis direction to pass through the midpoint of a line segment connecting an X-axis direction center 11aC of the first major electrode 11a and an X-axis direction center 11bC of the second major electrode 11b when projected onto the X-Y plane (a plane parallel to the first major surface 10a).

The region of the first major surface 10a between the central axis 59 and the center 11aC of the first major electrode 11a is taken as a first region R1. The region of the first major surface 10a between the central axis 59 and the center 11bC of the second major electrode 11b is taken as a second region R2. The direction from the first major electrode 11a toward the second major electrode 11b is taken as the +X direction. The direction from the second major electrode 11b toward the first major electrode 11a corresponds to the −X direction.

As illustrated in FIG. 1, each of the multiple first electrodes 11 has a first side surface 41 (one side surface of the first electrode 11) and a second side surface 42 (one other side surface of the first electrode 11). The first side surface 41 and the second side surface 42 extend in the Y-axis direction. The direction from the first side surface 41 toward the second side surface 42 is taken as the +X direction.

The first side surface 41 is the side surface of a portion (a pretilt reverse side portion 11Q) of the first electrode 11 on the −X direction side of the center of the first electrode 11. The second side surface 42 is the side surface of a portion (a pretilt forward side portion 11P) of the first electrode 11 on the +X direction side of the center of the first electrode 11.

The second substrate unit 20u includes a second substrate 20 and an opposing electrode 21. The second substrate 20 has a second major surface 20a opposing the first major surface 10a. The opposing electrode 21 is provided on the second major surface 20a.

In the specification, the state of being opposed includes not only the state of directly facing each other but also the state of facing each other with another component inserted therebetween.

The first substrate 10, the first electrodes 11, the second substrate 20, and the opposing electrode 21 are transmissive with respect to light. For example, these substrates and electrodes are transparent.

The first substrate 10 and the second substrate 20 may include, for example, a transparent material such as glass, a resin, etc. The first substrate 10 and the second substrate 20 have plate configurations or sheet configurations. For example, the thicknesses of the first substrate 10 and the second substrate 20 are not less than 50 micrometers (μm) and not more than 2000 μm. However, the thicknesses are arbitrary.

For example, the first electrodes 11 and the opposing electrode 21 include an oxide including at least one (one type) of element selected from the group consisting of In, Sn, Zn, and Ti. These electrodes may include, for example, ITO. For example, at least one selected from $In_2O_3$ and $SnO_3$ may be used. For example, the thicknesses of these electrodes are about 200 nanometers (nm) (e.g., not less than 100 nm and not more than 350 nm). For example, the thicknesses of the electrodes are set to be thicknesses to obtain a high transmittance with respect to visible light.

The disposition pitch of the first electrodes 11 (the distance between the X-axis direction centers of the most proximal first electrodes 11) is, for example, not less than 10 μm and not more than 1000 μm. The disposition pitch is set to meet the desired specifications (the characteristics of the gradient index lens described below). For example, the length (the width) of the first electrode 11 along the X-axis direction is not less than 5 μm and not more than 300 μm.

The liquid crystal layer 30 is provided between the first substrate unit 10u and the second substrate unit 20u. The liquid crystal layer 30 includes a liquid crystal material. The liquid crystal material may include a nematic liquid crystal (having a nematic phase at the temperature of use of the liquid crystal optical unit 111). The liquid crystal material has a positive dielectric anisotropy or a negative dielectric anisotropy. In the case of the positive dielectric anisotropy, the initial alignment of the liquid crystal of the liquid crystal layer 30 (the alignment when a voltage is not applied to the liquid crystal layer 30) is, for example, a horizontal alignment. In the case of the negative dielectric anisotropy, the initial alignment of the liquid crystal of the liquid crystal layer 30 is a vertical alignment.

For example, the thickness of the liquid crystal layer 30 (the length of the liquid crystal layer 30 along the Z-axis direction) is not less than 20 μm and not more than 50 μm, e.g., about 30 μm. The thickness of the liquid crystal layer 30 is the distance along the Z-axis direction between the first substrate unit 10u and the second substrate unit 20u.

For example, in the embodiment, the alignment of the liquid crystal of the liquid crystal layer 30 has a pretilt. The pretilt includes a director 30d of the liquid crystal that is oriented from the first substrate unit 10u toward the second substrate unit 20u along the +X direction which is the direction from the first side surface 41 toward the second side surface 42 (the direction from the first major electrode 11a toward the second major electrode 11b).

The pretilt angle is the angle between the X-Y plane and the director 30d of the liquid crystal (the axis in the long-axis direction of the liquid crystal molecules). In the case of the horizontal alignment, the pretilt angle is, for example, greater than 0° and less than 45°. In the case of the vertical alignment, the pretilt angle is, for example, greater than 45° and less than 90°.

For convenience in the specification, the horizontal alignment refers to the case where the pretilt angle is less than 45°; and the vertical alignment refers to the case where the pretilt angle exceeds 45°.

For example, the direction of the pretilt can be determined by a crystal rotation method, etc. Also, the direction of the pretilt can be determined by changing the alignment of the liquid crystal by applying a voltage to the liquid crystal layer 30 and observing the optical characteristics of the liquid crystal layer 30 during this change.

In the case where alignment processing of the first substrate unit 10u is performed by, for example, rubbing, etc., a direction AD1 of the alignment processing is along the +X direction. In this example, the direction AD1 of the alignment processing of the first substrate unit 10u is, for example, the +X direction.

The axis of the director 30d may be parallel or non-parallel to the +X direction when the director 30d of the liquid crystal is projected onto the X-Y plane. The direction of the pretilt has a +X direction component when the direction of the pretilt is projected onto the X axis.

The orientation direction of the liquid crystal layer 30 proximal to the second substrate unit 20u is antiparallel to the orientation direction of the liquid crystal layer 30 proximal to the first substrate unit 10u. In this example, a direction AD2 of the alignment processing of the second substrate unit 20u is the −X direction. In other words, the initial alignment is not a splay alignment.

The first substrate unit 10u may further include an alignment film (not illustrated). The multiple first electrodes 11 are disposed between the first substrate 10 and the alignment film of the first substrate unit 10u. The second substrate unit 20u may further include an alignment film (not illustrated). The opposing electrode 21 is disposed between the second substrate 20 and the alignment film of the second substrate unit 20u. The alignment films may include, for example, polyimide. The initial alignment of the liquid crystal layer 30 is obtained by, for example, performing rubbing of the alignment films. The direction of the rubbing of the first substrate unit 10u is antiparallel to the rubbing direction of the second substrate unit 20u. The initial alignment may be obtained by performing light irradiation of the alignment films.

The case will now be described where the dielectric anisotropy of the liquid crystal included in the liquid crystal layer 30 is positive and the initial alignment is the horizontal alignment.

The liquid crystal alignment of the liquid crystal layer 30 is changed by applying a voltage between the opposing electrode 21 and the first electrodes 11. A refractive index distribution is formed in the liquid crystal layer 30 according to this change; and the travel direction of the light that is incident on the liquid crystal optical unit 111 is caused to change by the refractive index distribution. The change of the travel direction of the light is mainly based on the refraction effect.

The image display unit 80 includes a display unit 86. The display unit 86 is stacked with the liquid crystal optical unit 111. The display unit 86 causes light including image information to be incident on the liquid crystal layer 30. The image display unit 80 may further include a display control unit 87 that controls the display unit 86. A signal including image information is supplied from the display control unit 87 to the display unit 86. The display unit 86 produces light that is modulated based on this signal. For example, the display unit 86 emits light including multiple parallax images. As described below, the liquid crystal optical unit 111 has an operating state in which the optical path is modified, and an operating state in which the optical path substantially is not modified. For example, the image display device 211 provides a three-dimensional display by the light being incident on the liquid crystal optical unit 111 in the operating state in which the optical path is modified. For example, the image display device 211 provides a two-dimensional image display in the operating state in which the optical path substantially is not modified.

The image display device 211 further includes a control unit 77. The control unit 77 may be connected to the display control unit 87 by a wired or wireless method (an electrical method, an optical method, etc.). The image display device 211 may further include a control unit (not illustrated) that controls the control unit 77 and the display control unit 87.

The control unit 77 is electrically connected to the multiple first electrodes 11 and the opposing electrode 21. A portion of the interconnects between the control unit 77 and the first electrodes 11 are not illustrated in FIG. 1 for easier viewing. The control unit 77 applies the first voltage between the opposing electrode 21 and the first electrodes 11.

For convenience in the specification, the state in which the potential is the same (is zero volts) between two electrodes also is taken to be included in the state in which the voltage is applied.

The first voltage may be a direct-current voltage or an alternating current voltage. For example, the polarity of the first voltage may change periodically. For example, the potential of the opposing electrode 21 may be fixed; and the potential of the first electrodes 11 may be changed as alternating current. The polarity of the potential of the opposing electrode 21 may be changed periodically; and the potential of the first electrodes 11 may be changed in conjunction with the change of the polarity of the opposing electrode 21 but with an opposite polarity. In other words, common inversion driving may be performed. Thereby, the power supply voltage of the drive circuit can be reduced; and the breakdown voltage specifications of the drive IC are relaxed.

In the case where the pretilt angle of the liquid crystal layer 30 is relatively small (e.g., not more than 10 degrees), a threshold voltage Vth relating to the change of the liquid crystal alignment of the liquid crystal layer 30 is relatively distinct. In such a case, for example, the first voltage is set to be greater than the threshold voltage Vth. The liquid crystal alignment of the liquid crystal layer 30 is changed by the application of the first voltage.

An alignment in which the tilt angle of the liquid crystal is large (e.g., the vertical alignment) is formed in the liquid crystal layer 30 of the region where the first voltage is applied. The effective refractive index of this region approaches the refractive index ($n_o$) with respect to ordinary light.

On the other hand, a voltage is not applied along the Z-axis direction in the regions between the first major electrode 11a and the second major electrode 11b. The initial alignment (e.g., the horizontal alignment) or an alignment that is near the initial alignment is formed in these regions. The refractive index of these regions with respect to the light that vibrates in the X-axis direction is or is near the refractive index ($n_e$) with respect to extraordinary light. Thereby, a refractive index distribution 31 is formed in the liquid crystal layer 30.

In the refractive index distribution 31, for example, the change of the refractive index is not less than about 20% and not more than about 80% of the difference between the refractive index with respect to extraordinary light and the refractive index with respect to ordinary light.

For example, the refractive index distribution 31 has a configuration corresponding to the distribution of the thickness of a convex lens. The liquid crystal optical unit 111 functions as a liquid crystal GRIN lens (Gradient Index lens) in which the refractive index changes in the plane. A lens that has optical characteristics having a lenticular configuration is formed in the liquid crystal optical unit 111.

In the refractive index distribution 31 that is formed, the position of the central axis 59 corresponds to the position of the lens center; and the positions of the first major electrode 11a and the second major electrode 11b correspond to the positions of the lens ends.

For example, in the liquid crystal optical unit 111, the operating state in which the optical path is modified is formed when the voltage is applied; and the operating state in which the optical path substantially is not modified is obtained when the voltage is not applied.

Figure 2:
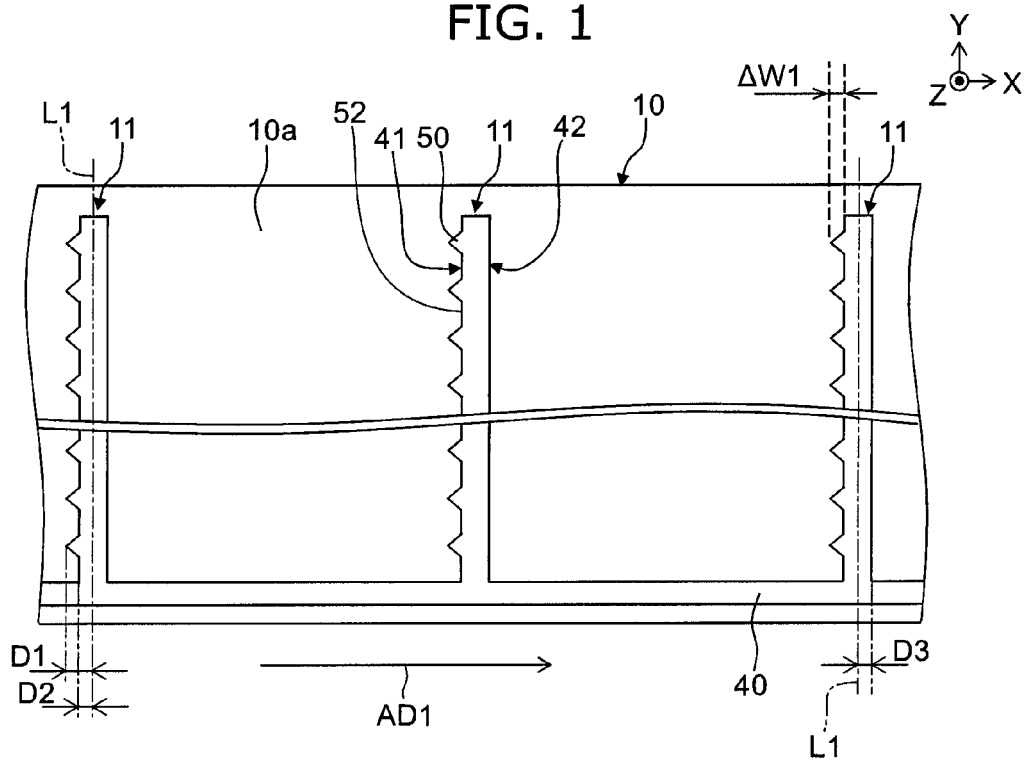
FIG. 2 is a schematic plan view illustrating a portion of the liquid crystal optical unit according to the first embodiment.

FIG. 2 is a schematic plan view illustrating a portion of the liquid crystal optical unit according to the first embodiment.

As illustrated in FIG. 2, each of the multiple first electrodes 11 has the first side surface 41 that is non-parallel to the first major surface 10a and extends in the Y-axis direction, and the second side surface 42 that is on the side opposite to the first side surface 41 in the X-axis direction, is non-parallel to the first major surface 10a, and extends in the Y-axis direction. The first side surface 41 extends in the Y-axis direction; and the position of the first side surface 41 changes in the X-axis direction to multiply cross the Y-axis direction.

The first side surface 41 is the side surface of the two Y-axis direction side surfaces of the first electrode 11 that is on the side facing the −X direction. The first side surface 41 faces the direction opposite to the direction of the pretilt of the liquid crystal layer 30. The first side surface 41 faces the direction (the upstream side of the alignment processing) that is opposite to the direction AD1 of the alignment processing of the first substrate unit 10u. In the first electrode 11, the X-axis direction position of the first side surface 41 that faces the direction opposite to the direction of the pretilt of the liquid crystal layer 30 changes.

The first side surface 41 of each of the multiple first electrodes 11 has a protruding portion 50 (a first protruding portion), and a recessed portion 52 (a first recessed portion) arranged with the protruding portion 50 in the Y-axis direction. A first line L1 extending along the Y-axis direction is set between the first side surface 41 and the second side surface 42. A first distance D1 along the X-axis direction between the first line L1 and the protruding portion 50 is longer than a second distance D2 along the X-axis direction between the first line L1 and the recessed portion 52. The fluctuation along the Y-axis direction of a third distance D3 along the X-axis direction between the first line L1 and the second side surface 42 is less than the absolute value of the difference between the first distance D1 and the second distance D2. The third distance D3 along the X-axis direction between the first line L1 and the second side surface 42 is substantially constant along the Y-axis direction. In other words, in this example, the X-axis direction position of the second side surface 42 substantially does not change along the Y-axis direction. Here, for example, the third distance D3 being constant is the state in which the change of the third distance D3 along the Y-axis direction is not more than 5%. The first side surface 41 includes multiple protruding portions 50 and multiple recessed portions 52. The multiple protruding portions 50 and the multiple recessed portions 52 are arranged alternately in the Y-axis direction. The change of the X-axis direction position of the first side surface 41 is formed due to the multiple protruding portions 50 and the multiple recessed portions 52. In this example, the protruding portion 50 has a triangular configuration, e.g., an isosceles-triangular configuration. For example, the recessed portion 52 has a straight line configuration extending along the Y-axis direction. In this example, the configurations of the multiple protruding portions 50 are substantially the same. The spacing of the multiple protruding portions 50 in the Y-axis direction is substantially constant. However, in the embodiment, the configurations of the protruding portions 50 are arbitrary; and the spacing of the multiple protruding portions 50 in the Y-axis direction may not be constant.

The change amount (a first change amount ΔW1) of the first side surface 41 along the X-axis direction is less than the length (the thickness) of the liquid crystal layer 30 along the Z-axis direction. In this example, the first change amount ΔW1 is less than 30 μm. For example, the first change amount ΔW1 is not less than 5 μm and not more than 20 μm. The first change amount ΔW1 is the absolute value of the difference between the first distance D1 and the second distance D2.

In this example, the first substrate unit 10u further includes a connection unit 40. One Y-axis direction end of each of the multiple first electrodes 11 is connected to the connection unit 40. For example, the connection unit 40 is used to electrically connect the first electrodes 11. In this example, the multiple first electrodes 11 are connected to one connection unit 40. The configuration including the multiple first electrodes 11 and the connection unit 40 is a comb teeth configuration. A voltage can be applied to each of the multiple first electrodes 11 by applying the voltage to the connection unit 40. The connection unit 40 may include, for example, substantially the same material as that of the first electrodes 11. The connection unit 40 may be formed separately from the multiple first electrodes 11.

According to investigations of the inventor of the application, it was found that reverse tilt, in which the tilt direction of the liquid crystal reverses, occurs easily at the first electrode 11 to which a high voltage is applied. The reverse tilt occurs because an electric field of the reverse direction with respect to the pretilt direction of the initial alignment of the liquid crystal layer 30 is applied. The reverse tilt occurs easily at the pretilt reverse side portion 11Q of the first electrode 11 on the −X direction side of the center of the first electrode 11. On the other hand, the reverse tilt does not occur easily at the pretilt forward side portion 11P of the first electrode 11 on the +X direction side of the center of the first electrode 11.

There is a tendency for the reverse tilt to increase in operations in which the voltage is applied. In the case where the degree of the reverse tilt is pronounced, the alignment of the liquid crystal becomes disordered. For example, disclinations occur. Such disclinations are in an unstable state energy-wise because the disclinations are formed at the boundary of alignment domains having different tilt angles and/or twist angles due to a balance between alignment states of the alignment domains. Then, when some stimulus occurs, the disclinations change easily. For example, bending occurs along the Y-axis direction at a pitch that is several times the X-axis direction width of the first electrode 11; and the width of the disclination region is several or more times that of the case where the bending does not occur. In the state in which pronounced bending occurs, the effect of the disclination region on the optical characteristic degradation of the liquid crystal optical unit 111 is extremely large. Thereby, the desired refractive index distribution 31 is not obtained; and the display quality decreases.

For example, it was found that the reverse tilt occurs easily in a configuration in which the X-axis direction positions of the first side surface 41 and the second side surface 42 substantially do not change.

In the liquid crystal optical unit 111 according to this embodiment, the X-axis direction position of the first side surface 41, which is the pretilt reverse side portion 11Q side, changes. Thereby, singularities are formed in the electric field distribution. It is possible to control the disclinations using these singularities. As a result, excessive bending of the disclinations can be suppressed; and degradation of lens performance can be suppressed. According to the liquid crystal optical unit 111 and the image display device 211 according to this embodiment, a high-quality display can be provided.

In this example, the first change amount ΔW1 of the first side surface 41 is less than the thickness of the liquid crystal layer 30. Thereby, the effects of the change of the position of the first side surface 41 on the electric field distribution are appropriately set. Thereby, the quality of the display can be increased further.

FIG. 3A to FIG. 3H are schematic plan views illustrating the portions of other liquid crystal optical units according to the first embodiment.

Figure 3A:
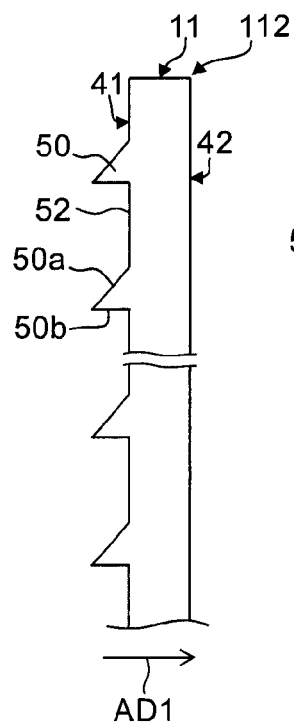
FIG. 3A to FIG. 3H are schematic plan views illustrating the configurations of portions of other liquid crystal optical units according to the first embodiment.

In a liquid crystal optical unit 112 as illustrated in FIG. 3A, one side 50a of the triangular configuration of the protruding portion 50 is longer than one other side 50b. In the liquid crystal optical unit 112, the configuration of the protruding portion 50 is a right triangle. In this example, the protruding portion 50 is asymmetric with respect to the X-axis direction when projected onto the X-Y plane. Among the sides of the protruding portion 50, the side 50a that is tilted with respect to the Y-axis direction causes the electric field that is created to tilt with respect to the X-axis direction and the Y-axis direction. Thereby, a twisting force can be caused to act on the liquid crystal of the liquid crystal layer 30; and the disclinations can be suppressed further.

In the case where a chiral agent is added to the liquid crystal material of the liquid crystal layer 30, the twist direction of the chiral agent is caused to be the same as the orientation of the electric field that is created at the side 50a. Thereby, the occurrence of the reverse tilt can be suppressed more appropriately.

Figure 3B:
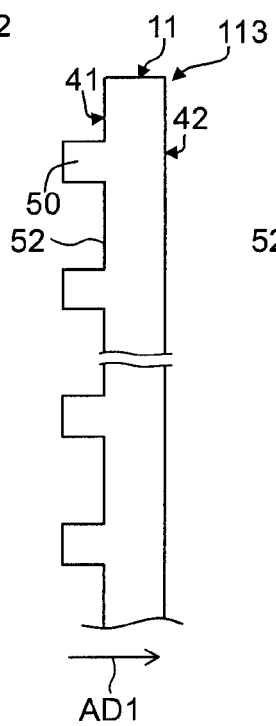
Figure 3C:
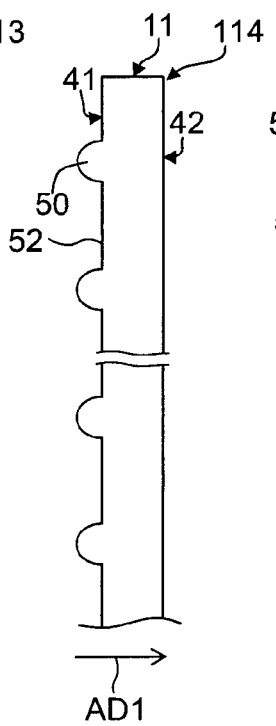
Figure 3D:
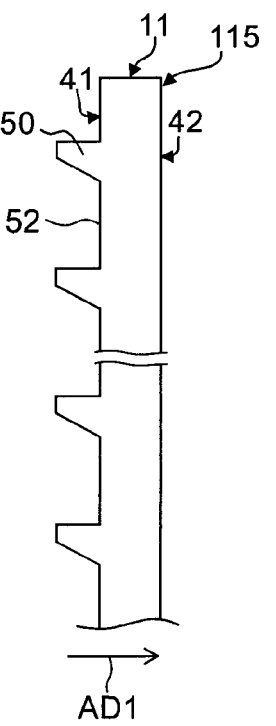

In liquid crystal optical units 113 to 115 as illustrated in FIG. 3B to FIG. 3D, the protruding portion 50 has a rectangular configuration, a semielliptical configuration, or a trapezoidal configuration.

Thus, the protruding portion 50 is arbitrary. In the liquid crystal optical units 112 to 115 as well, the occurrence of the reverse tilt can be suppressed. The excessive bending of the disclinations can be suppressed. Thereby, a liquid crystal optical apparatus and an image display device that provide a high-quality display are obtained. The configuration and/or the size of each of the multiple protruding portions 50 may be changed. For example, a protruding portion 50 having a triangular configuration and a protruding portion 50 having a semielliptical configuration may be provided in one first electrode 11.

Figure 3E:
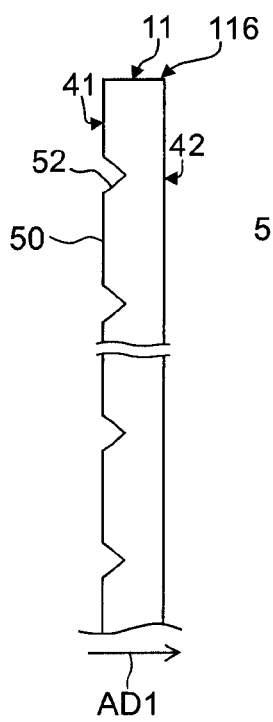

In a liquid crystal optical unit 116 as illustrated in FIG. 3E, the recessed portion 52 is an isosceles triangle. The protruding portion 50 has a straight line configuration extending along the Y-axis direction.

Figure 3F:
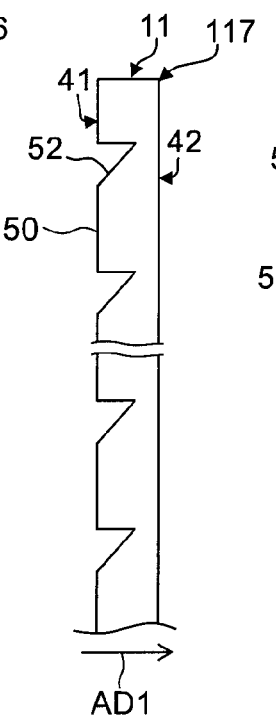

In a liquid crystal optical unit 117 as illustrated in FIG. 3F, the recessed portion 52 has a right-triangular configuration. In this example, the recessed portion 52 is asymmetric with respect to the X-axis direction when projected onto the X-Y plane. The recessed portion 52 may be a rectangular configuration, a semielliptical configuration, or a trapezoidal configuration. The recessed portion 52 is arbitrary. Thus, in the liquid crystal optical units 116 and 117 as well, a high-quality display can be provided by the X-axis direction position of the first side surface 41 changing due to the recessed portion 52.

Figure 3G:
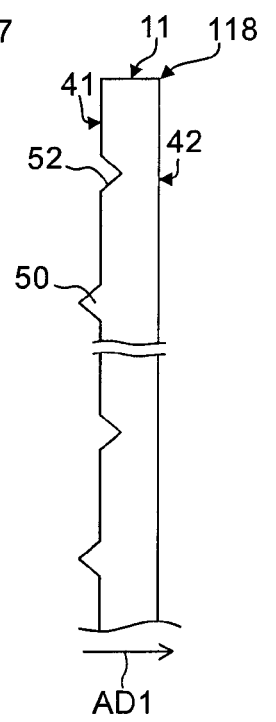

In a liquid crystal optical unit 118 as illustrated in FIG. 3G, the first side surface 41 of the first electrode 11 includes the multiple protruding portions 50 and the multiple recessed portions 52. Thus, the change of the X-axis direction position of the first side surface 41 may be formed due to the multiple protruding portions 50 and the multiple recessed portions 52.

Figure 3H:
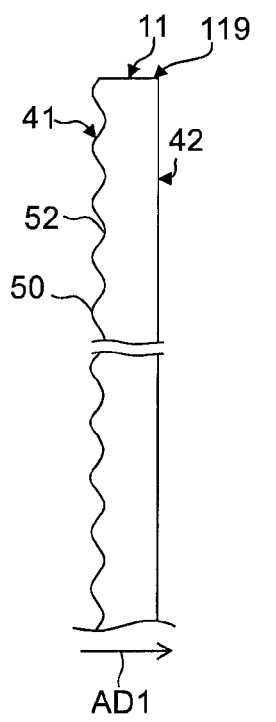

In a liquid crystal optical unit 119 as illustrated in FIG. 3H, the X-axis direction position of the first side surface 41 changes continuously along the Y-axis direction. In other words, the first side surface 41 of the liquid crystal optical unit 119 is curved in a wave-like configuration. Thus, the change of the X-axis direction position of the first side surface 41 may be formed by causing the first side surface 41 to curve in a wave-like configuration. In such a case as well, the first side surface 41 includes the multiple protruding portions 50 and the multiple recessed portions 52. The change of the X-axis direction position of the first side surface 41 may be bent in a zigzag configuration.

Thus, in the embodiment, one side surface (the first side surface 41) of the first electrode 11 includes the protruding portion 50 and the recessed portion 52.

FIG. 4A to FIG. 4E are schematic plan views illustrating the configurations of portions of other liquid crystal optical units according to the first embodiment.

In a liquid crystal optical unit 121 as illustrated in FIG. 4A, the position of the second side surface 42 of the first electrode 11 changes in the X-axis direction to multiply cross the Y-axis direction.

Thus, the X-axis direction position of the second side surface 42 also may change. In the liquid crystal optical unit 121 as well, a high-quality display can be provided.

In the first electrode 11 of the liquid crystal optical unit 121, the first side surface 41 includes multiple first protruding portions 50Q and multiple first recessed portions 52Q. The second side surface 42 includes a second protruding portion 50P, and a second recessed portion 52P that is arranged with the second protruding portion 50P in the Y-axis direction. A distance D4 along the X-axis direction between the first line L1 and the second protruding portion 50P is longer than a distance D5 along the X-axis direction between the first line L1 and the second recessed portion 52P. The second side surface 42 includes multiple second protruding portions 50P and multiple second recessed portions 52P. The multiple second protruding portions 50P and the multiple second recessed portions 52P are arranged alternately in the Y-axis direction. The change of the X-axis direction position of the second side surface 42 is formed due to the multiple second protruding portions 50P and the multiple second recessed portions 52P.

In the liquid crystal optical unit 121, for example, the number of the first protruding portions 50Q is greater than the number of the second protruding portions 50P. In the liquid crystal optical unit 121, the change of the X-axis direction position of the first side surface 41 is larger than the change of the X-axis direction position of the second side surface 42. Specifically, the number of times the first side surface 41 crosses the Y-axis direction is greater than the number of times the second side surface 42 crosses the Y-axis direction.

As described above, the reverse tilt occurs easily at the pretilt reverse side portion 11Q. In other words, the X-axis direction positions of the first side surface 41 and the second side surface 42 change to correspond to the occurrence of the reverse tilt. Thereby, the quality of the display can be increased further.

In a liquid crystal optical unit 122 as illustrated in FIG. 4B, the first change amount ΔW1 of the X-axis direction position of the first protruding portion 50Q is greater than a second change amount ΔW2 of the X-axis direction position of the second protruding portion SOP. The second change amount ΔW2 is the absolute value of the difference between the fourth distance D4 and the fifth distance D5. The first protruding portion 50Q and the second protruding portion SOP are arbitrary. The first protruding portion 50Q may be different from the second protruding portion 50P. For example, the first protruding portion 50Q may have a triangular configuration; and the second protruding portion 50P may have a semielliptical configuration.

In a liquid crystal optical unit 123 as illustrated in FIG. 4C, the first side surface 41 has the multiple first recessed portions 52Q; and the second side surface 42 has the multiple second recessed portions 52P. Thus, the X-axis direction positions of the first side surface 41 and the second side surface 42 may change due to the first recessed portion 52Q and the second recessed portion 52P. The first recessed portion 52Q and the second recessed portion 52P are arbitrary.

In a liquid crystal optical unit 124 as illustrated in FIG. 4D, the X-axis direction position of the first side surface 41 changes continuously along the Y-axis direction; and the X-axis direction position of the second side surface 42 changes continuously along the Y-axis direction. In other words, in the liquid crystal optical unit 124, the first side surface 41 and the second side surface 42 of the first electrode 11 are curved in wave-like configurations. A first length PT1 along the Y-axis direction between two most proximal first protruding portions 50Q is shorter than a second length PT2 along the Y-axis direction between two most proximal second protruding portions 50P. In other words, the period of the curve of the wave-like configuration of the first side surface 41 is shorter than the period of the curve of the wave-like configuration of the second side surface 42. The number of times the first side surface 41 crosses the Y-axis direction is greater than the number of times the second side surface 42 crosses the Y-axis direction. In the case where the first side surface 41 and the second side surface 42 are curved in wave-like configurations, the change of the X-axis direction position of the first side surface 41 may be greater than the change of the X-axis direction position of the second side surface 42 due to the period.

In a liquid crystal optical unit 125 as illustrated in FIG. 4E, the amplitude of the curve of the wave-like configuration of the first side surface 41 is larger than the amplitude of the curve of the wave-like configuration of the second side surface 42. In other words, the first change amount $\Delta W1$ of the first side surface 41 is greater than the second change amount $\Delta W2$ of the second side surface 42. Thus, in the case where the first side surface 41 and the second side surface 42 are curved in wave-like configurations, the change of the X-axis direction position of the first side surface 41 may be greater than the change of the X-axis direction position of the second side surface 42 due to the amplitude.

Thus, the second side surface 42 (the one other side surface of the first electrode 11) may include a protruding portion (the second protruding portion 50P) and a recessed portion (the second recessed portion 52P). The size (e.g., the first change amount $\Delta W1$) of the protruding portion (the first protruding portion 50Q) and the recessed portion (the first recessed portion 52Q) of the first side surface 41 (the one side surface of the first electrode 11) is larger than the size (the second change amount $\Delta W2$) of the protruding portion and the recessed portion of the second side surface 42.

Figure 5:
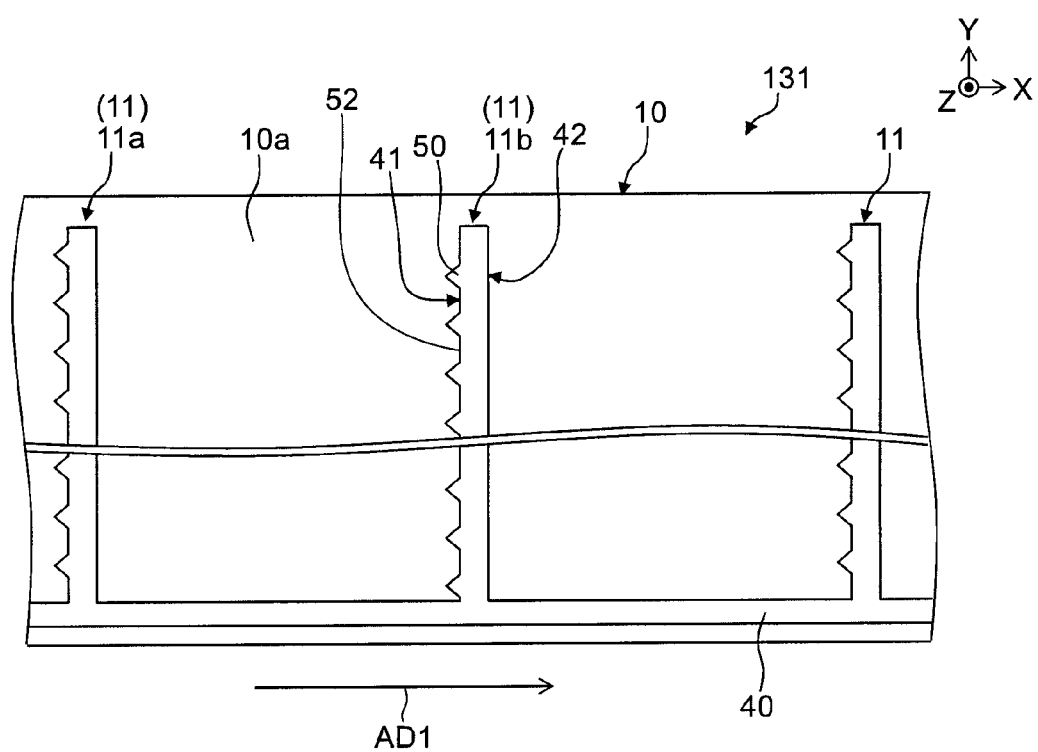
FIG. 5 is a schematic plan view illustrating a portion of another liquid crystal optical unit according to the first embodiment.

FIG. 5 is a schematic plan view illustrating a portion of another liquid crystal optical unit according to the first embodiment.

In the liquid crystal optical unit 131 as illustrated in FIG. 5, the Y-axis direction position of the protruding portion 50 provided in the first major electrode 11a and the Y-axis direction position of the recessed portion 52 provided in the first major electrode 11a are different from the Y-axis direction position of the protruding portion 50 provided in the second major electrode 11b and the Y-axis direction position of the recessed portion 52 provided in the second major electrode 11b. The change of the X-axis direction position of the first side surface 41 of one of two most proximal first electrodes 11 is different from the change of the X-axis direction position of the first side surface 41 of the other of the two most proximal first electrodes 11. For example, the position where the singularity of the electric field distribution is formed is different between the two most proximal first electrodes 11. For example, the position where the occurrence of the reverse tilt is suppressed is different between the two most proximal first electrodes 11. Thereby, the quality of the display can be increased further.

Second Embodiment

Figure 6A:
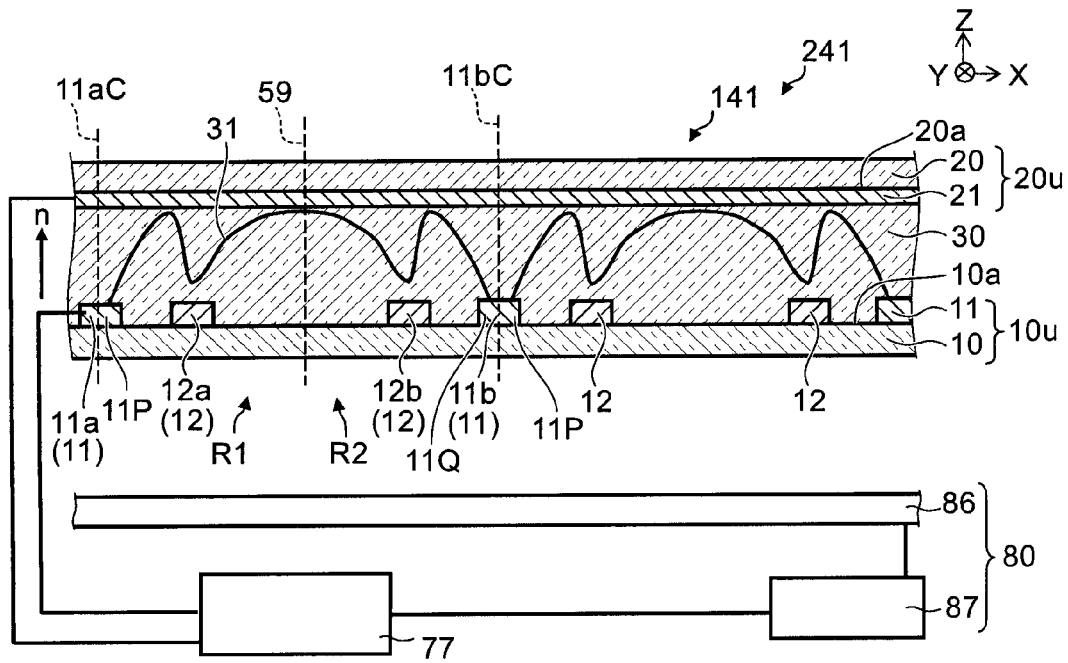
FIG. 6A and FIG. 6B are schematic views illustrating the configurations of a liquid crystal optical apparatus and an image display device according to a second embodiment.
Figure 6B:
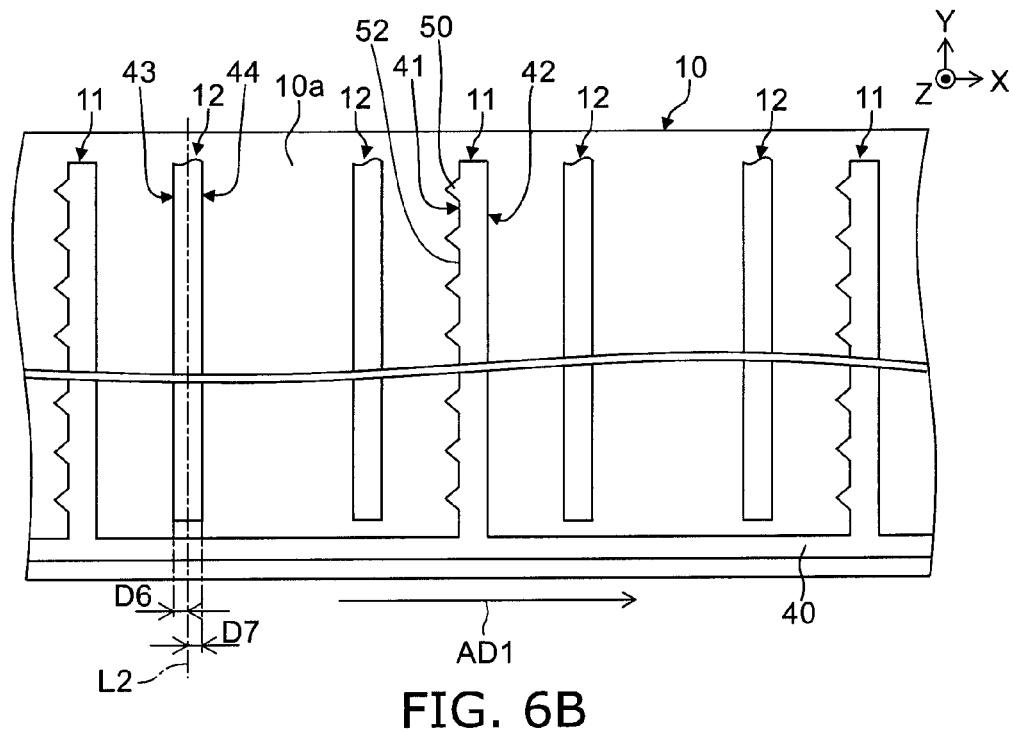

FIG. 6A and FIG. 6B are schematic views illustrating the configurations of a liquid crystal optical apparatus and an image display device according to a second embodiment.

FIG. 6A is a schematic cross-sectional view illustrating the configurations of the liquid crystal optical unit 141 and the image display device 241. FIG. 6B is a schematic plan view illustrating a portion of the liquid crystal optical unit 141.

In the liquid crystal optical unit 141 of the image display device 241 according to this embodiment as illustrated in FIG. 6A and FIG. 6B, the first substrate unit 10u further includes multiple second electrodes 12. Thus, the first substrate unit 10u further includes the multiple second electrodes 12 that are provided in the spaces between the multiple first electrodes 11 on the first major surface 10a to extend in the Y-axis direction. In this example, at least a first sub electrode 12a and a second sub electrode 12b are provided as the second electrodes 12.

The first sub electrode 12a of the multiple second electrodes 12 is provided on the first major surface 10a in the first region R1 to extend in the Y-axis direction.

The second sub electrode 12b of the multiple second electrodes 12 is provided on the first major surface 10a in the second region R2 to extend in the Y-axis direction.

The second electrode 12 may include substantially the same material as that of the first electrode 11 and the opposing electrode 21. For example, the thickness of the second electrode 12 is about 200 nm (e.g., not less than 100 nm and not more than 350 nm). Thereby, good transmittance with respect to visible light is obtained. For example, the length (the width) of the second electrode 12 along the X-axis direction is not less than 5 μm and not more than 300 μm.

In this example, the control unit 77 is electrically connected to the first electrodes 11, the second electrodes 12, and the opposing electrode 21. The interconnects between the control unit 77 and the second electrodes 12 are not illustrated in FIG. 6A for easier viewing. The control unit 77 applies the first voltage between the opposing electrode 21 and the first electrodes 11 and the second voltage between the opposing electrode 21 and the second electrodes 12. The first voltage is relatively higher than the second voltage.

An alignment in which the tilt angle of the liquid crystal is large (e.g., the vertical alignment) is formed in the liquid crystal layer 30 of the regions where the first voltage and the second voltage are applied. The effective refractive index of these regions approaches the refractive index ($n_o$) with respect to ordinary light.

On the other hand, a voltage is not applied along the Z-axis direction in the region between the first major electrode 11a and the first sub electrode 12a, the region between the first sub electrode 12a and the second sub electrode 12b, and the region between the second sub electrode 12b and the second major electrode 11b. The initial alignment (e.g., the horizontal alignment) or an alignment that is near the initial alignment is formed in these regions. The refractive index of these regions with respect to the light that vibrates in the X-axis direction is or is near the refractive index ($n_e$) with respect to extraordinary light. Thereby, the refractive index distribution 31 is formed in the liquid crystal layer 30.

In the refractive index distribution 31, for example, the change of the refractive index is not less than about 20% and not more than about 80% of the difference between the refractive index with respect to extraordinary light and the refractive index with respect to ordinary light. In this example, for example, the refractive index distribution 31 has a configuration corresponding to the distribution of the thickness of a Fresnel lens.

In this example, the position of the first side surface 41 of the first electrode 11 changes in the X-axis direction. The X-axis direction position of the second side surface 42 substantially does not change. The first side surface 41 has at least one selected from the protruding portion 50 and the recessed portion 52.

Each of the multiple second electrodes 12 has a third side surface 43 that is non-parallel to the first major surface 10a and extends in the Y-axis direction; and a fourth side surface 44 that is on the side opposite to the third side surface 43 in the X-axis direction, is non-parallel to the first major surface 10a, and extends in the Y-axis direction. The third side surface 43 is the side surface of the two Y-axis direction side surfaces of the second electrode 12 that faces the −X direction. The fourth side surface 44 is the side surface of the two Y-axis direction side surfaces of the second electrode 12 that faces the +X direction. A second line L2 is set to extend along the Y-axis direction between the third side surface 43 and the fourth side surface 44. The fluctuation along the Y-axis direction of a sixth distance D6 along the X-axis direction between the second line L2 and the third side surface 43 is less than the absolute value of the difference between the first distance D1 and the second distance D2. The distance D6 along the X-axis direction between the second line L2 and the third side surface 43 is substantially constant along the Y-axis direction. In other words, the X-axis direction position of the third side surface 43 substantially does not change. The fluctuation along the Y-axis direction of a seventh distance D7 along the X-axis direction between the second line L2 and the fourth side surface 44 is less than the absolute value of the difference between the first distance D1 and the second distance D2. The distance D7 along the X-axis direction between the second line L2 and the fourth side surface 44 is substantially constant along the Y-axis direction. In other words, the X-axis direction position of the fourth side surface 44 substantially does not change. For example, the change of the sixth distance D6 along the Y-axis direction and the change of the seventh distance D7 along the Y-axis direction are not more than 5%.

The X-axis direction position of the first side surface 41 of the first electrode 11, to which a relatively high voltage is applied, changes. Thereby, for example, the occurrence of the reverse tilt can be suppressed effectively.

The X-axis direction position of the third side surface 43 and/or the fourth side surface 44 of the second electrode 12 may change. The third side surface 43 and the fourth side surface 44 may have a protruding portion and a recessed portion. It is favorable for the change of the X-axis direction position of the third side surface 43 to be smaller than the change of the X-axis direction position of the first side surface 41. It is favorable for the change of the X-axis direction position of the fourth side surface 44 to be smaller than the change of the X-axis direction position of the first side surface 41. It is favorable for the change of the X-axis direction position of the fourth side surface 44 to be smaller than the change of the X-axis direction position of the third side surface 43. In other words, the X-axis direction positions of the first side surface 41 to the fourth side surface 44 change to correspond to the occurrence frequency of the reverse tilt. Thereby, the quality of the display can be increased further.

The liquid crystal optical unit (the liquid crystal optical apparatus) may include more electrodes between the first major electrode 11a and the second major electrode 11b to apply voltages that are different from the first voltage or the second voltage. For example, an electrode that extends in the Y-axis direction may be further provided at a position overlaying the central axis 59. For example, the potential of this electrode is set to be the same as the potential of the opposing electrode 21. For example, the initial alignment is maintained for the alignment of the liquid crystal layer 30 at the central axis 59.

According to the embodiments, a liquid crystal optical apparatus and an image display device that provide a high-quality display can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the invention is not limited to these specific examples. For example, one skilled in the art may similarly practice the invention by appropriately selecting specific configurations of components included in liquid crystal optical apparatuses such as substrate units, second substrate units, liquid crystal layers, first substrates, second substrates, first electrodes, opposing electrodes, first side surfaces, second side surfaces, protruding portions, and recessed portions, specific configurations of components included in image display devices such as display units, image display units, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all liquid crystal optical apparatuses and image display devices practicable by an appropriate design modification by one skilled in the art based on the liquid crystal optical apparatuses and image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical apparatus, comprising:
 a first substrate unit including
  a first substrate, and
  a plurality of first electrodes provided on the first substrate to extend in a first direction, the first electrodes being arranged in a direction intersecting the first direction, each of the first electrodes having a first side surface and a second side surface opposite to the first side surface, each of the first and second side surfaces being non-parallel to the first substrate to extend in the first direction;
a second substrate unit including
a second substrate opposing the first substrate, and
an opposing electrode provided on the second substrate to oppose the first electrodes; and
a liquid crystal layer provided between the first substrate unit and the second substrate unit,
the first side surface having:
a first protruding portion; and
a first recessed portion arranged with the first protruding portion in the first direction.

2. The apparatus according to claim 1, wherein:
the liquid crystal layer has a pretilt in which a director of a liquid crystal included in the liquid crystal layer is oriented from the first substrate unit toward the second substrate unit along a direction from the first side surface toward the second side surface.

3. The apparatus according to claim 1, wherein
a first line extends along the first direction between the first side surface and the second side surface,
a second direction is parallel to the first substrate and perpendicular to the first direction,
a first distance along a second direction between the first protruding portion and the first line is longer than a second distance along the second direction between the first recessed portion and the first line,
a fluctuation along the first direction of a third distance along the second direction between the first line and the second side surface is less than the absolute value of the difference between the first distance and the second distance.

4. The apparatus according to claim 1, wherein:
a first line extends along the first direction between the first side surface and the second side surface,
a second direction is parallel to the first substrate and perpendicular to the first direction,
a first distance along a second direction between the first protruding portion and the first line is longer than a second distance along the second direction between the first recessed portion and the first line,
the second side surface has
a second protruding portion, and
a second recessed portion arranged with the second protruding portion in the first direction; and
a fourth distance along the second direction between the first line and the second protruding portion is longer than a fifth distance along the second direction between the first line and the second recessed portion.

5. The apparatus according to claim 4, wherein:
a plurality of the first protruding portions is provided on the first side surface of the first electrode, a plurality of the second protruding portions is provided on the second side surface of the first electrode, and the number of the first protruding portions on each first electrode is greater than the number of the second protruding portions on each first electrode; and
a plurality of the first recessed portions is provided, a plurality of the second recessed portions is provided, and the number of the first recessed portions is greater than the number of the second recessed portions.

6. The apparatus according to claim 4, wherein the absolute value of the difference between the first distance and the second distance is greater than the absolute value of the difference between the fourth distance and the fifth distance.

7. The apparatus according to claim 4, wherein:
the first side surface has a plurality of the first protruding portions and a plurality of the first recessed portions, and the first protruding portions and the first recessed portions are arranged alternately in the first direction;
a second-direction position of the first side surface changes continuously along the first direction;
the second side surface has a plurality of the second protruding portions and a plurality of the second recessed portions, and the second protruding portions and the second recessed portions are arranged alternately in the first direction;
a second-direction position of the second side surface changes continuously along the first direction; and
a length along the first direction between two most proximal first protruding portions is shorter than a length along the first direction between two most proximal second protruding portions.

8. The apparatus according to claim 4, wherein:
the first line is longer than a second distance along the second direction between the first recessed portion and the first line,
the first side surface has a plurality of the first protruding portions and a plurality of the first recessed portions, and the first protruding portions and the first recessed portions are arranged alternately in the first direction;
a second-direction position of the first side surface changes continuously along the first direction;
the second side surface has a plurality of the second protruding portions and a plurality of the second recessed portions, and the second protruding portions and the second recessed portions are arranged alternately in the first direction;
a second-direction position of the second side surface changes continuously along the first direction; and
the absolute value of the difference between the first distance and the second distance is greater than the absolute value of the difference between the fourth distance and the fifth distance.

9. The apparatus according to claim 1, wherein
a first line extends along the first direction between the first side surface and the second side surface,
a second direction is parallel to the first substrate and perpendicular to the first direction,
a first distance along a second direction between the first protruding portion and the first line is longer than a second distance along the second direction between the first recessed portion and the first line,
the absolute value of the difference between the first distance and the second distance is less than a thickness of the liquid crystal layer.

10. The apparatus according to claim 9, wherein the absolute value of the difference between the first distance and the second distance is not less than 5 μm and not more than 20 μm.

11. The apparatus according to claim 1, wherein:
a first-direction position of the first protruding portion included in one of the first electrodes is different from a first-direction position of the first protruding portion included in one other of the first electrodes most proximal to the one; and
a first-direction position of the first recessed portion included in the one of the first electrodes is different from a first-direction position of the first recessed portion included in the one other.

12. The apparatus according to claim 1, wherein:
the first substrate unit further includes a plurality of second electrodes extending in the first direction; and the second electrodes are provided respectively in spaces between the first electrodes on the first substrate.

13. The apparatus according to claim 12, wherein:
a first line extends along the first direction between the first side surface and the second side surface,
a second direction is parallel to the first substrate and perpendicular to the first direction,
a first distance along a second direction between the first protruding portion and the first line is longer than a second distance along the second direction between the first recessed portion and the first line,
the second electrodes has a third side surface and a fourth side surface opposite to the third side surface, the third side surface being non-parallel to the first substrate to extend in the first direction, the fourth side surface being non-parallel to the first substrate to extend in the first direction;
fluctuation along the first direction of a sixth distance along the second direction between the third side surface and a second line is less than the absolute value of the difference between the first distance and the second distance, the second line extending along the first direction between the third side surface and the fourth side surface; and
fluctuation along the first direction of a seventh distance along the second direction between the second line and the fourth side surface is less than the absolute value of the difference between the first distance and the second distance.

14. The apparatus according to claim 12, wherein:
one of the second electrodes is disposed between one of the first electrodes and a center, the center being between the one of the first electrodes and one other of the first electrodes most proximal to the one of the first electrodes; and
one other of the second electrodes is disposed between the center and the one other of the first electrodes.

15. The apparatus according to claim 1, wherein the liquid crystal layer has a horizontal alignment in a state in which a voltage is not applied between the opposing electrode and the first electrodes.

16. The apparatus according to claim 1, wherein the first protruding portion has one selected from a triangular configuration, a rectangular configuration, a semielliptical configuration, and a trapezoidal configuration.

17. The apparatus according to claim 16, wherein:
the first protruding portion has a triangular configuration;
a length of one side of the first protruding portion having the triangular configuration is longer than a length of one other side of the first protruding portion;
the first recessed portion has a triangular configuration; and
a length of one side of the first recessed portion having the triangular configuration is longer than a length of one other side of the first recessed portion.

18. An image display device, comprising:
a liquid crystal optical unit including
a first substrate unit including
a first substrate, and
a plurality of first electrodes provided on the first substrate to extend in a first direction, the first electrodes being arranged in a direction intersecting the first direction, each of the first electrodes having a first side surface and a second side surface, each of the first and second side surfaces being non-parallel to the first substrate to extend in the first direction,
a second substrate unit including
a second substrate opposing the first substrate, and
an opposing electrode provided on the second substrate to oppose the first electrodes, and
a liquid crystal layer provided between the first substrate unit and the second substrate unit; and
an image display unit stacked with the liquid crystal optical unit, the image display unit including a display unit configured to cause light including image information to be incident on the liquid crystal layer,
the first side surface having a first protruding portion and a first recessed portion arranged with the first protruding portion in the first direction.

19. The device according to claim 18, further comprising a control unit configured to apply a first voltage between the opposing electrode and the first electrodes,
an alignment of a liquid crystal included in the liquid crystal layer being changed by the first voltage.

20. The device according to claim 19, wherein:
the first substrate unit further includes a plurality of second electrodes extending in the first direction;
the second electrodes is provided respectively in spaces between the first electrodes on the first substrate; and
the control unit is configured to apply a second voltage between the opposing electrode and the second electrodes, the second voltage being lower than the first voltage.

* * * * *